Jan. 26, 1926.　　　　　　　　　　　　　　　　　　　1,570,785
F. E. SCHNEIDER
AUTOMATIC TRUCK DUMP
Filed May 10, 1924　　　　3 Sheets-Sheet 1
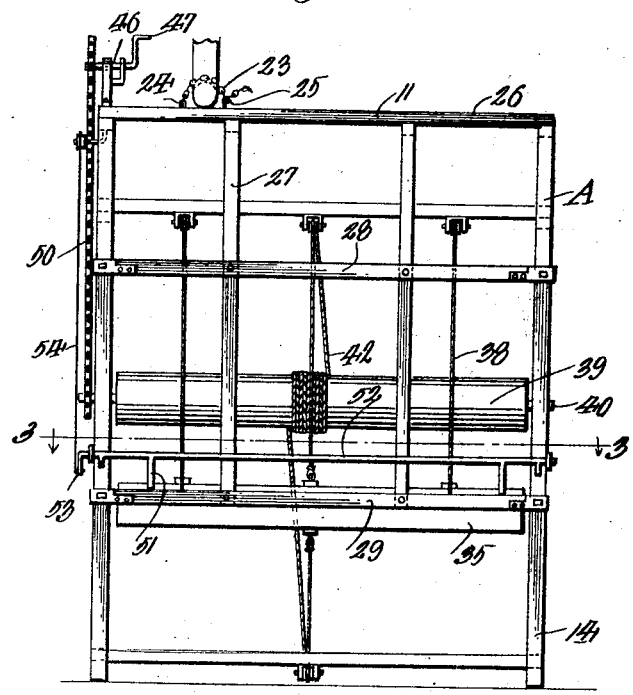

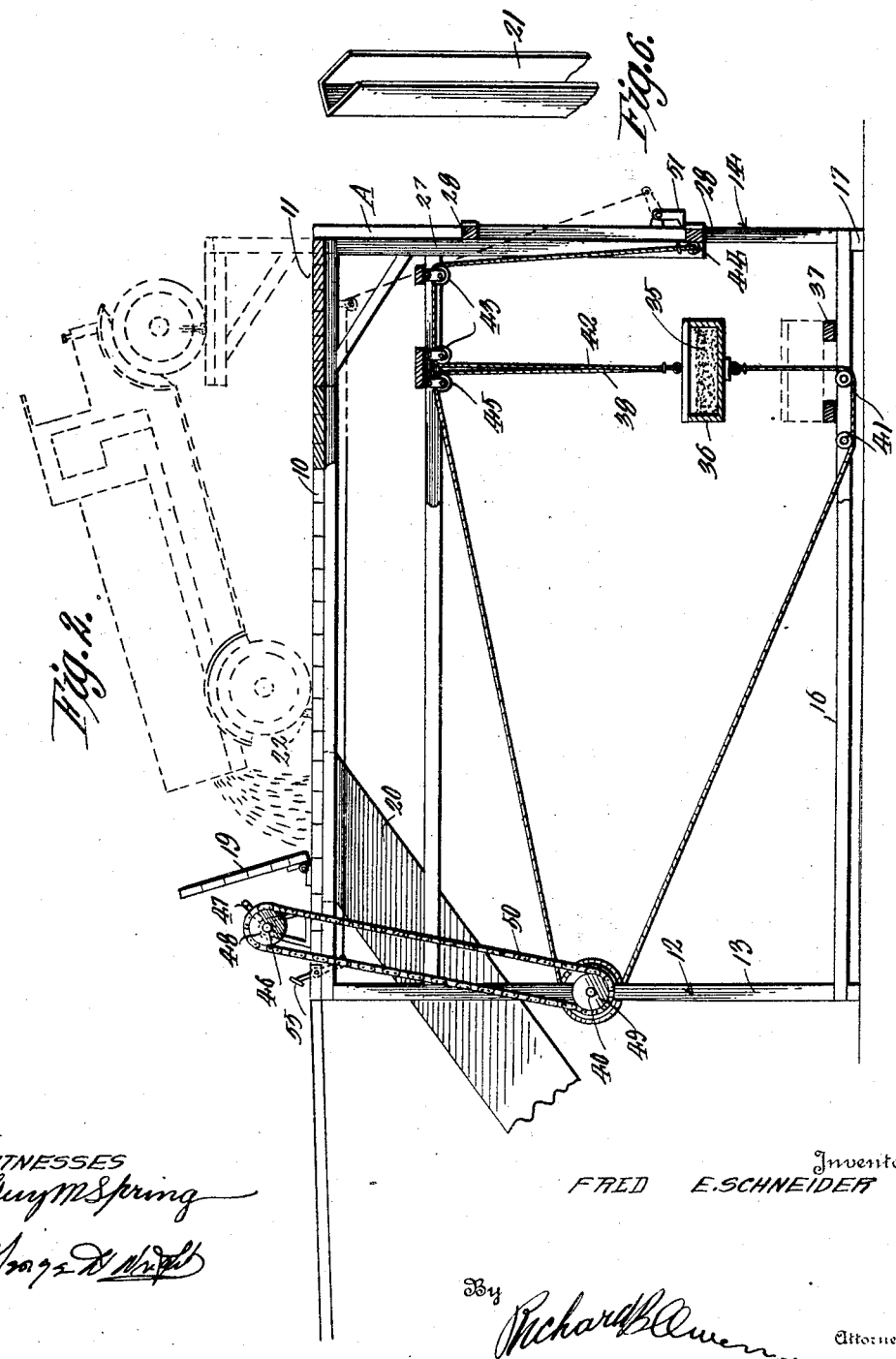

Jan. 26, 1926.
F. E. SCHNEIDER
1,570,785
AUTOMATIC TRUCK DUMP
Filed May 10, 1924
3 Sheets-Sheet 3
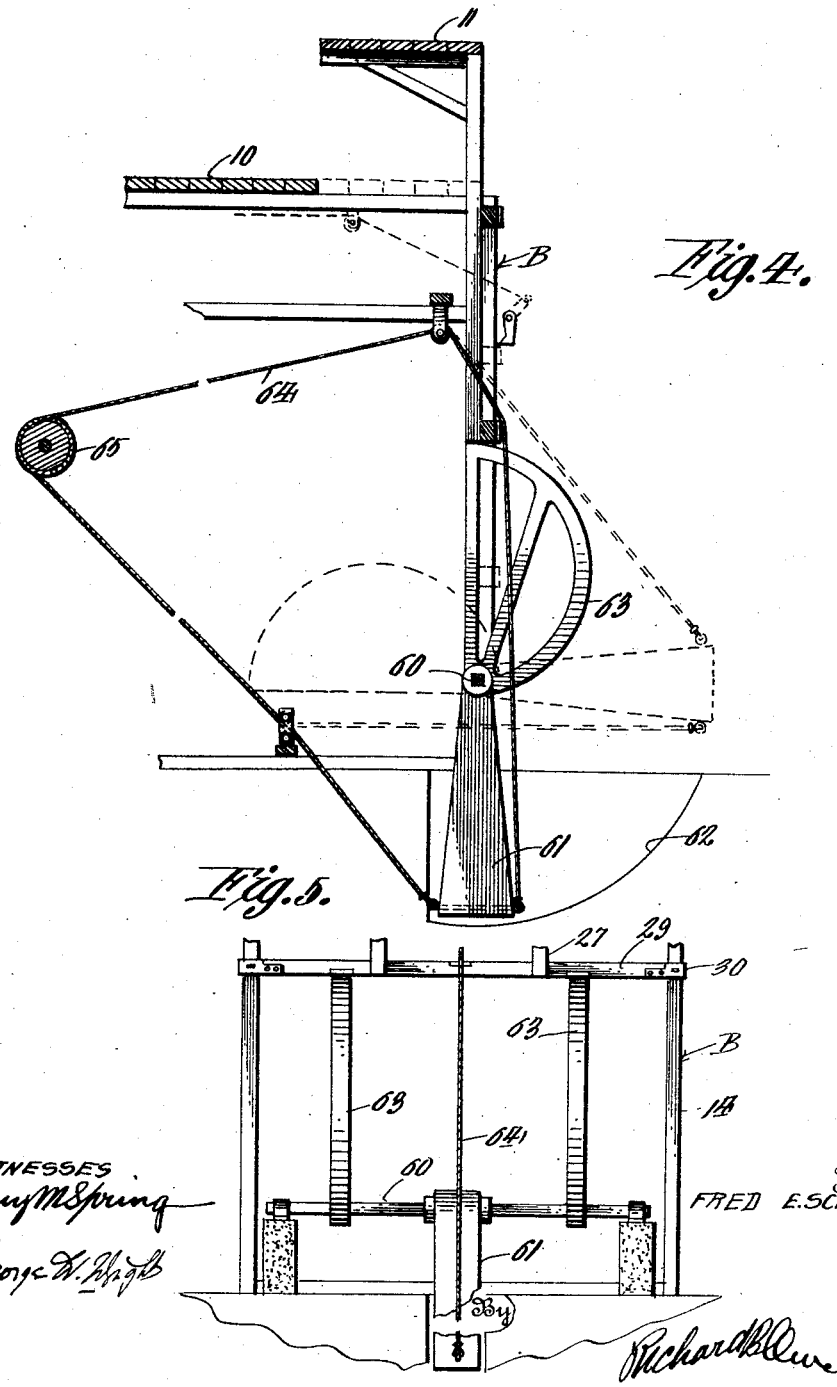

Patented Jan. 26, 1926.

1,570,785

UNITED STATES PATENT OFFICE.

FRED E. SCHNEIDER, OF HITCHCOCK, OKLAHOMA.

AUTOMATIC TRUCK DUMP.

Application filed May 10, 1924. Serial No. 712,378.

*To all whom it may concern:*

Be it known that I, FRED E. SCHNEIDER, a citizen of the United States, residing at Hitchcock, in the county of Blaine and State of Oklahoma, have invented certain new and useful Improvements in Automatic Truck Dumps, of which the following is a specification.

This invention appertains to hoisting and dumping mechanisms and the primary object of the invention is to provide an improved device for dumping vehicles which can be operated in an expeditious manner with a minimum amount of energy.

Another object of the invention is to provide means for dumping an automobile truck at grain elevators and the like embodying an unloading platform for receiving the truck and a movable elevating platform for receiving the truck's front wheels, and novel means for permitting the convenient raising and lowering of the said elevating platform.

A further object of the invention is the provision of a novel counter-balance for the elevating platform whereby the platform can be raised and lowered with a minimum amount of energy.

A still further object of the invention is to provide an improved dumping device for automobile trucks of the above character, which will be durable and efficient in use, one that will be simple and easy to manufacture, and one which can be placed upon the market at a small cost.

With these and other objects in view, the invention consists in the novel construction, arrangement, and formation of parts, as will be hereinafter more specifically described, claimed, and illustrated in the accompanying drawings, in which drawings:

Figure 1 is an end elevation of the improved motor truck dumping appliance,

Figure 2 is a side elevation of the same showing parts thereof in section and illustrating the raised position of the dump in dotted lines, Figure 3 is a fragmentary horizontal section taken on the line 3—3 of Figure 1 illustrating the means for normally holding the lift or dump in its lowered position against movement, Figure 4 is a fragmentary vertical central section through a different or modified form of my invention, Figure 5 is a fragmentary end elevation of the same, Figure 6 is a detailed perspective view of one of the wear-members carried by the supporting posts, and Figure 7 is a detailed perspective view of one of the anti-friction guide members.

Referring to the drawings in detail, wherein similar reference characters designate corresponding parts throughout the several views, the letter A generally indicates one form of my invention and B a modified form thereof.

As shown the improved device A comprises an unloading platform 10 at one end of which is arranged the lift 11, as will be hereinafter more fully described. The unloading platform 10 is mounted upon a suitable frame 12, which will now be briefly described.

The supporting frame 12 as shown embodies corner supporting posts 13 and 14 and these posts 13 and 14 are connected together by upper beams 15 upon which the platform 10 is laid. The lower ends of the pairs of corner standards 13 and 14 are braced by longitudinally extending beams 16 and if so desired the posts can be rested upon bottom sills 17. As shown intermediate longitudinally extending bracing beams 18 are provided. The dumping platform 10 is provided with the usual trap door 19 which is utilized for normally closing the grain chute 20 in which the grain is adapted to be dumped for leading into the granary. The inner faces of the front pair of posts 14 are provided with metal wear members 21 and as shown these metal wear members 21 are of a channel beamed construction and are fitted closely around the said posts or standards.

When a motor truck is driven onto the platform 10, the front wheels of the truck are adapted to rest on the lift 11 and it is obvious that when the lift 11 is raised that the forward end of the automobile truck will be lifted which of course will tip the truck and thus permit the contents thereof to be dumped. The lift 11 is arranged at a predetermined distance from the trap door 19 and chute 20 so that when a truck is tilted that the contents thereof will flow down into the chute 20. Any preferred type of block 22 can be utilized for fitting under the rear wheels of the motor truck and I prefer to connect the front wheels of the truck by suitable chains or the like 23 on the lift 11. As shown the chain 23 is connected at one end by an iron bolt or the like 24 of the lift while the opposite end is adapted to be slipped over a suitable hook or the like 25 of the said lift.

The lift 11 embodies a transversely extending platform 26 which is also adapted to rest upon the upper longitudinal beams 15 when the lift is in its lowered position. The platform 26 embodies a pair of vertically extending supporting posts 27 which are connected together by upper and lower transversely extending horizontally disposed brace members 28 and 29. The terminals of these brace members 28 and 29 carry anti-friction guide members 30 clearly shown in Figure 7 of the drawings. These anti-friction guide members 30 embody sockets 31 for receiving the terminals of the bracing members 28 and 29 and the socket portions 31 are riveted to the said bracing members or otherwise connected thereto in any desired way. The sockets in turn carry outwardly extending spaced arms 32 and the outer walls of the sockets and the arms 32 carry anti-friction rollers 33 for engaging the wear members 21 carried by the posts 14.

In order to bring about the easy raising and lowering of the lift, I provide as clearly shown in Figure 1 a vertically movable counter-balance 35 which as shown embodies a transversely extending box 36 which is adapted to be filled with some heavy substance such as pig iron, rocks, sand, or the like. This counter-balance 35 is adapted to normally rest upon a bed 37 carried by the lower longitudinally extending beams 16. This counter-balance has secured to its upper and lower ends the terminals of a pull cable 38 and the cable is in turn trained about an operating drum 39 which is keyed or otherwise secured to a transversely extending shaft 40 which is rotatably mounted in the pair of standards 13. The lower run of the pull cable 38 is trained over suitable guide pulleys 41 as clearly shown in Figure 2 of the drawings. The counter-balance 35 has also secured thereto a pull cable 42 which is trained over suitable overhead guide pulleys 43. The outer end of the pull cable 42 is secured as at 44 to the lower beam or brace bar 29 as clearly shown in Figures 1 and 2 of the drawings. It is to be also noted at this point that the upper run of the pull rope 38 is trained over suitable guide pulleys 45.

In order to bring about the rotation of the winding drum 39 when so desired I provide on operating shaft 46 which is arranged adjacent to the trap door 19. This shaft 46 can be operated by a suitable hand crank or the like 47. The shaft 46 has secured thereto a suitable sprocket wheel 48 which is in alignment with a sprocket wheel 49 keyed or otherwise secured to the shaft 40. These sprocket wheels 48 and 49 have trained about the same a sprocket chain 50 and it is obvious that upon rotation of the shaft 46 that the winding drum will be rotated. If so desired a pawl and ratchet mechanism can be utilized for holding the shaft 46 locked in any desired position.

The counter-balance 35 is of a sufficient weight as to normally counter-balance an unloaded truck and thus it is obvious that the said counter-balance will normally tend to raise the lift. In order to hold the lift normally against movement I provide ratchets 51 which are formed on the rock shaft 52. This rock shaft 52 is rotatably mounted in suitable bearings carried by the pair of corner standards or posts 14. One end of the rock shaft 52 has formed thereon a crank arm 53 to which is connected a pull cable 54. This pull cable 54 is in turn connected to a foot pedal 55 and it can be seen that upon movement of the foot pedal that the combined rock and lock shaft 52 will be operated so as to move the ratchets 51 from out of the path of the lower brace beam 29 which will permit the raising of the lift.

When a loaded truck is driven onto the unloading platform 10 it is obvious that the same can be dumped with the expenditure of a minimum amount of energy in view of the fact that the weight 35 will normally counterbalance the truck and as the majority of the weight of the load is on the rear wheels of the truck, the front part of the truck can be easily raised by the operator. When the lift 11 returns to its normal position, the lower beam 29 will hit the ratchets 51 and rock the shaft and thus automatically move these ratchets out of the way and after the brace 29 has passed thereby, the ratchets will automatically swing to their operative position and hold the lift against upward movement when the truck is driven from off of the loading platform.

The form of my invention shown in Figures 4 and 5 of the drawings and indicated by the reference character B is substantially the same as the form shown in Figures 1 to 3 inclusive, with the exception of the form of counter-balance used. In the form B of my invention I provide a main rock shaft 60 which is provided with radially extending relatively heavy weighted arms 61 which are adapted to normally rest in a pit 62 formed in the ground for that purpose. The shaft 60 has also secured thereto or formed thereon diametrically extending arms 63, which serve in a measure as guides for the shaft. The counter-balancing arm 61 has secured to the opposite sides thereof the terminals of a pull cable 64 which is trained about the operating drum 65 which is actuated in the same manner as the drum 39. The lift is also normally held in its lowered position by suitable ratchets which are the same as the ratchets 51. In this form of the invention, it is obvious that the arms 61 will serve as an effective counter-balance and permit the easy raising and lowering of the lift 11.

Changes in details may be made without departing from the spirit or the scope of this invention; but:

What I claim as new is:

1. In a device of the class described, a platform upon which a vehicle to be dumped is adapted to be driven, a lift including a platform arranged at the forward end of the first mentioned platform for receiving the front wheels of a vehicle, a counter-balance, means for operatively connecting the lift with the counter-balance, a pull cable for actuating the counter-balance, a winding drum, the pull cable being trained about said drum, and means for operating the drum.

2. A device for dumping vehicles comprising a platform, a lift arranged at one end of the platform adapted to receive the front wheels of the vehicle to be dumped, said lift embodying a lifting platform, vertically extending beams, and transverse crossed brace beams, a counter-balance, means connecting the counter-balance with the lift for normally tending to raise the lift, a lock including a rock shaft and latch lever for engaging one of the transverse crossed beams for normally preventing raising movement of the lift, a pedal, and a pull cable connected with the pedal and rock shaft for permitting the rocking of the shaft for moving the latch from out of engagement with the crossed brace beam, and means for operating the counter-balance.

3. In a vehicle dumping device, a main platform upon which the vehicle to be dumped is adapted to be driven, a lift including a platform adapted to be arranged at one end of the main platform for receiving the front wheels of the vehicle to be dumped, and a movable counter-balancing weight, a pull cable having its terminals connected respectively to the upper and lower ends of the counter-balance, a second pull cable connecting the counter-balance to the lift for normally tending to raise the lift, a winding drum, the first-mentioned cable being trained about the winding drum, and means for operating the winding drum from the main platform.

In testimony whereof I affix my signature.

FRED E. SCHNEIDER.